INVENTOR.
GEORGE R. JOHNSON
BY
Baldwin, Egan, Walling & Fetzer
ATTORNEYS

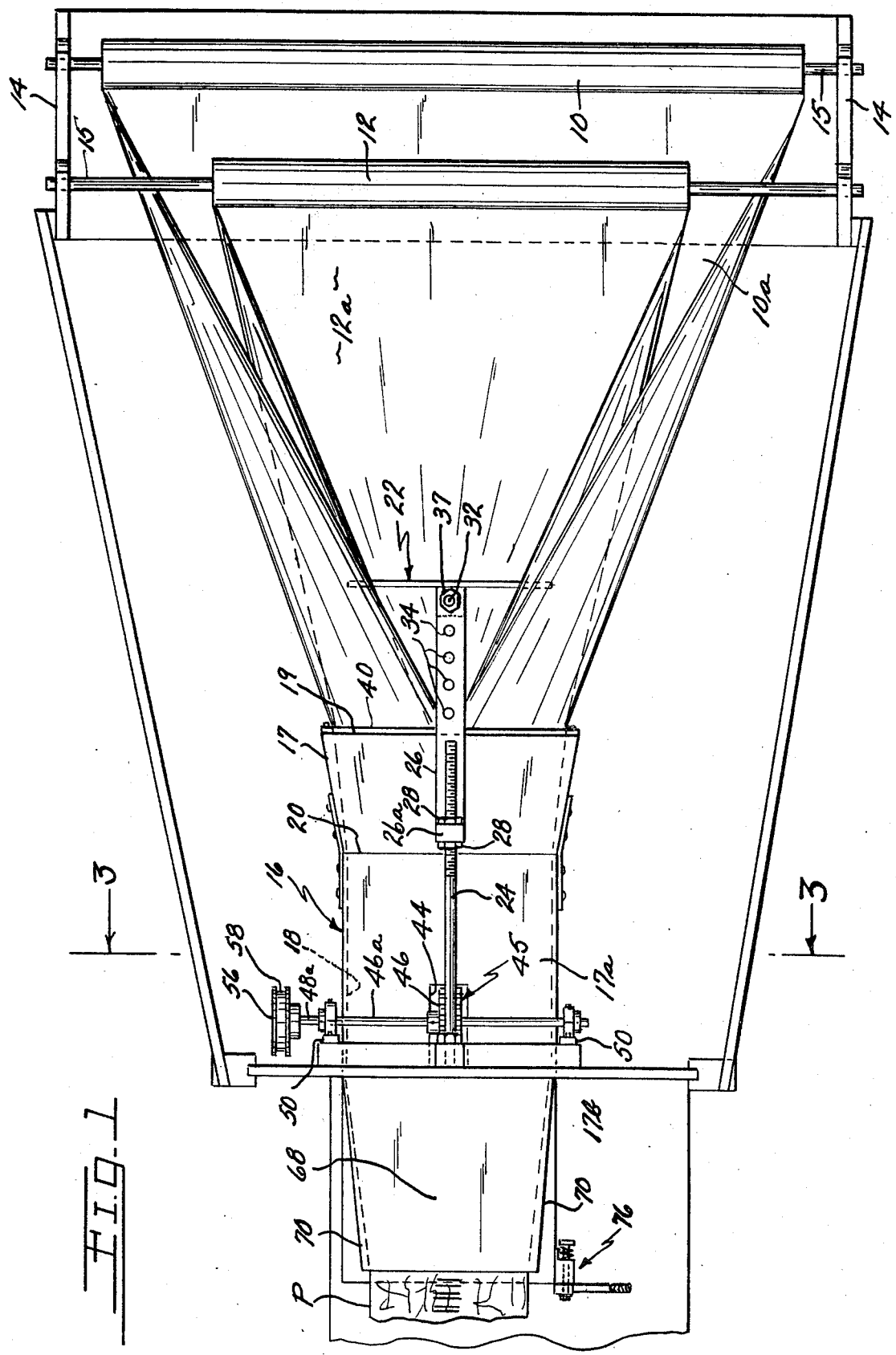

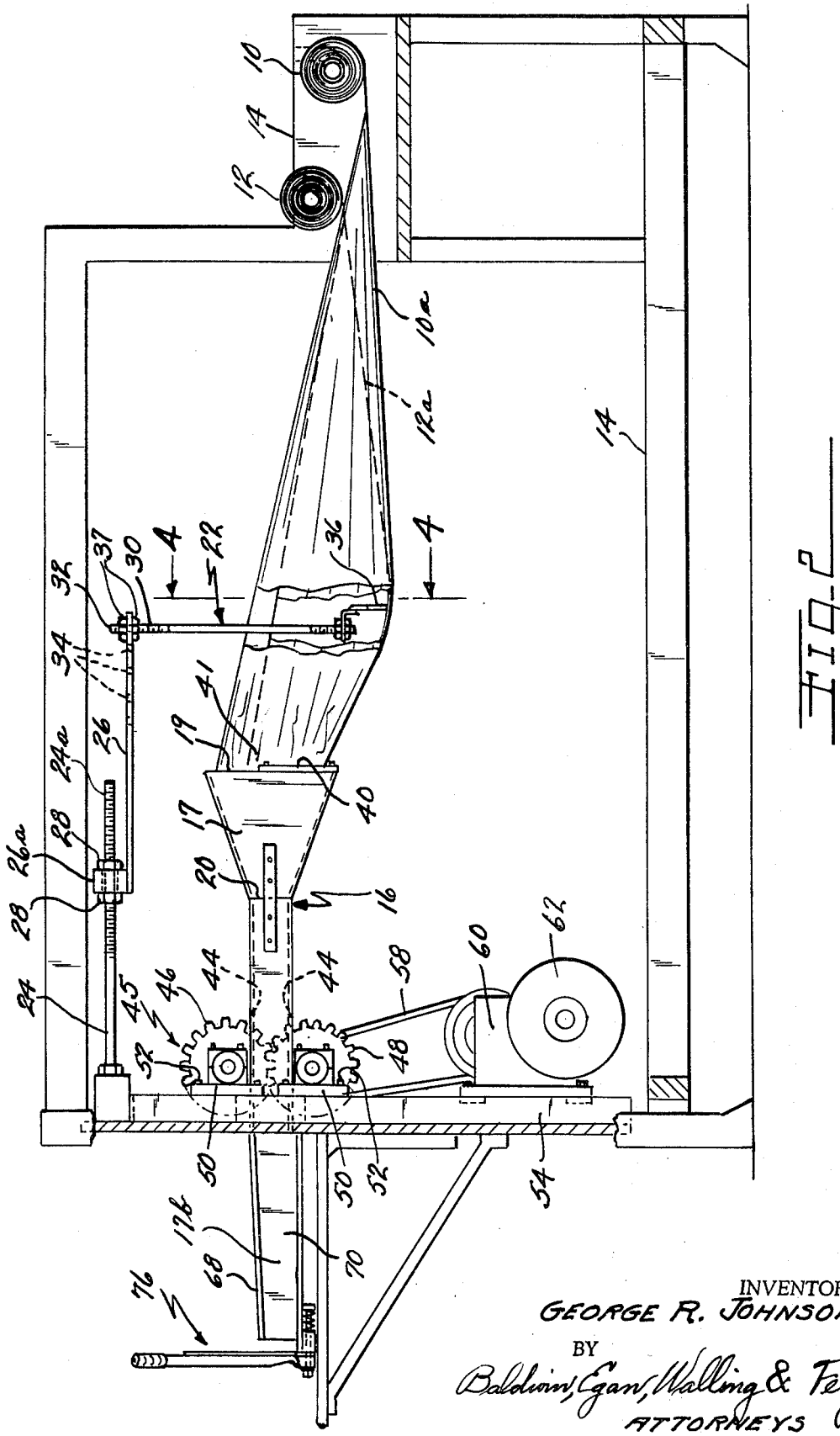

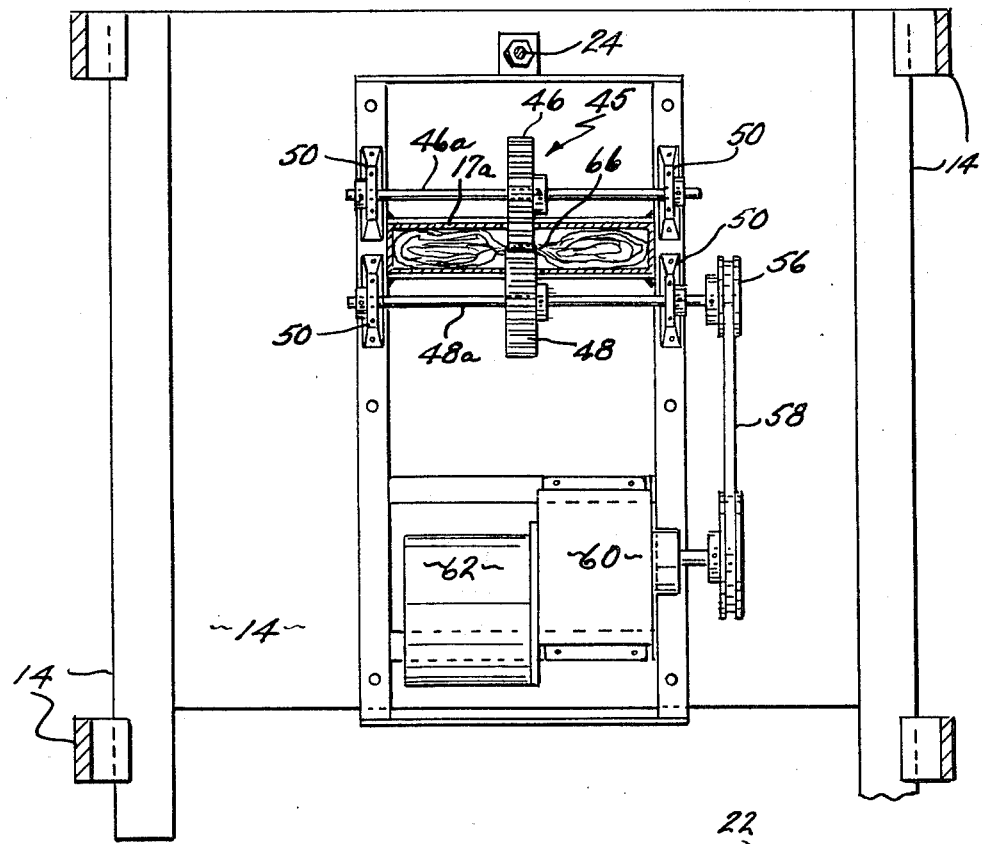
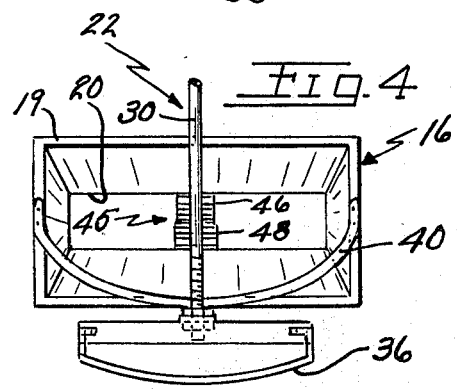
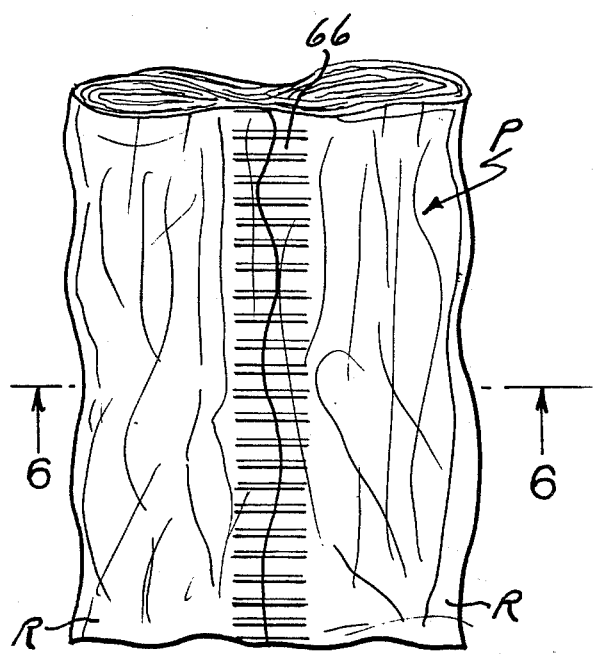
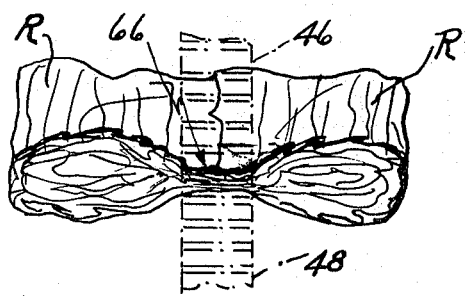

United States Patent Office 3,509,798
Patented May 5, 1970

---

3,509,798
MECHANISM AND METHOD FOR PRODUCING CUSHIONING DUNNAGE
George R. Johnson, Chagrin Falls, Ohio, assignor to The Arpax Company, Chagrin Falls, Ohio, a corporation of Ohio
Filed Feb. 7, 1968, Ser. No. 703,588
Int. Cl. B31d 5/04; B31f 1/10, 5/00
U.S. Cl. 93—1                                                    12 Claims

ABSTRACT OF THE DISCLOSURE

A cushioning dunnage-producing mechanism comprising a support for a plurality of rolls of sheet-like stock material, with the sheets of such stock material disposed in superimposed relation and fed into a crumpler section of rectangular-shaped tubular construction, to compress the sheet-like material into a pad-like configuration of dunnage product. The lateral edges of the sheet-like material are rolled inwardly into spiral-like form prior to passage of the stock material into the crumpler section, and meshed spur gears coin or stitch the confronting portions of the rolled edge sections of the stock material together, to hold the dunnage product in a pad-like configuration possessing high resiliency. A cutter mechanism is provided for cutting the pad into the desired lengths. The finalized pad comprises highly resilient pillow-like lateral portions, and a compressed or coined central section of lesser resiliency as compared to the lateral portions.

---

This invention relates in general to mechanism for producing packing material or cushioning dunnage as it is known in the art, and more particularly a dunnage-producing mechanism for producing a continuous, resilient, pad-like dunnage product from sheet-like material, such as paper. The novel pad-like dunnage product has a relatively low density per unit volume, and can be rapidly produced on the machine of the invention. The invention also relates to a novel method for producing pad-like cushioning dunnage.

Various mechanisms are known in the art for producing lengths of packing material for use in packaging breakable items in enclosing containers. One such mechanism is disclosed in U.S. Patent 2,882,802, issued Apr. 21, 1959 to Charles Robert Walker and entitled "Crumpling Device." The dunnage product produced on the machine of the present application possesses substantially greater cushioning resiliency for providing adequate cushioning protection. Various other dunnage producing mechanisms are disclosed in applicant's copending U.S. patent application Ser. No. 640,145 filed May 22, 1967.

The present invention provides a novel mechanism for expeditiously producing from preferably a plurality of webs of sheet-like material, such as paper, a pad-like cushioning dunnage product having good resiliency and which dunnage product is of a relatively low density per unit volume. The invention also provides a novel method of producing packing material, and a novel cushioning dunnage product of resilient pad-like configuration. The user is able to convert paper from rolls having densities of for instance of 40 to 50 pounds per cubic foot, requiring relatively little storage space, into cushioning dunnage having densities of for instance of one to two pounds per cubic foot, and as needed for direct placement into a package at a packaging station.

Accordingly, an object of the invention is to provide a novel mechanism for producing dunnage or packing material.

Another object of the invention is to provide a mechanism of the latter type which utilizes a plurality of webs of sheet-like material and forms such webs of material into a pad-like cushioning dunnage product of relatively low density per unit volume.

A further object of the invention is to provide the mechanism of the character described in which the lateral edge portions of the sheet-like material are urged into generally spiral or rolled form, in cross section, and then the sheet-like material is drawn generally horizontally through a crumpler section of the mechanism by means of meshed gears which grip the crumpled rolled edged sheets of material generally centrally thereof and stitch the rolled edge portions of such sheets together to provide a unitary pad-like cushioning dunnage product.

A further object of the invention is to provide a novel method for producing a resilient cushioning dunnage product of generally pad-like configuration comprising rolling the edges of sheet-like material inwardly to form generally spiral portions, compressing the rolled edged sheet-like material together into generally pad-like configuration, and connecting together the abutting generally centrally-disposed mating areas of the crumpled pad, to maintain the pad-like configuration while preserving the resilient characteristics of the crumpled sheet material.

A still further object of the invention is to provide a novel dunnage product of relatively low density per unit volume and in a pad-like configuration with connecting means extending lengthwise of the pad.

Other objects and advantages of the invention will be apparent from the following description taken in conjunction with the accompanying drawings wherein:

FIG. 1 is a generally diagrammatic top-plan view of the mechanism of the invention;

FIG. 2 is a side-elevational view of the mechanism illustrated in FIG. 1;

FIG. 3 is a sectional view taken generally along the plane of the line 3—3 of FIG. 1 looking in the direction of the arrows;

FIG. 4 is a fragmentary view taken generally along the plane of 4—4 of FIG. 2 looking in the direction of the arrows, and illustrating the pusher means which aids in rolling the edges of the sheet-like stock material into spiral-like configuration prior to movement of the rolled-edged stock into the crumpling section of the mechanism;

FIG. 5 is a fragmentary generally diagrammatic top-plan view of the cushioning dunnage product produced by the mechanism;

FIG. 6 is a sectional view taken generally along the plane of line 6—6 of FIG. 5 looking in the direction of the arrows;

Figure 7:
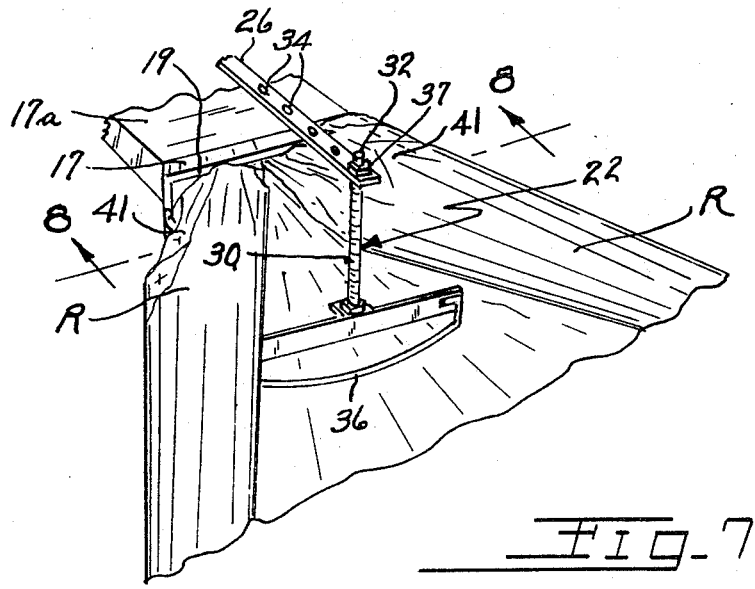
FIG. 7 is a fragmentary, perspective view illustrating the rolling of the edges of the sheet-like stock material above the pusher.
Figure 8:
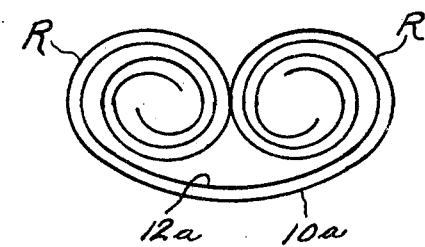
Figure 9:
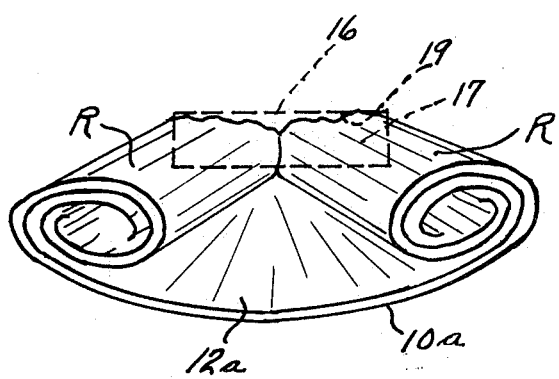

FIG. 8 is a diagrammatic end-elevational illustration of the generally spirally-rolled sheet material just after it has passed the pusher means of FIG. 7; and FIG. 9 is a diagrammatic generally end elevational, fragmentary illustration of the superimposed webs of sheet-like material with their lateral edges rolled into generally spiral form, converging into the crumpler section of the mechanism for producing the pad-like construction of dunnage product.

Referring now again to the drawings, there is illustrated a plurality of rolls 10 and 12 of sheet-like or web-like material, rotatably mounted on a support 14, for feeding of the sheet-like material lengthwise of the dunnage-producing machine. The sheet-like material may be of any suitable type, with paper, such as 30 pound kraft paper, having been found to be satisfactory. However, it will be understood that other types of papers and other sheet-like materials may also be satisfactory, the kraft paper having been found to provide a particularly expeditious type of cushioning dunnage product.

As can be seen, the inner roll 12 may be of a lesser width than the outer roll 10 and with the axis of the outer roll 10 being preferably disposed below the axis of the inner roll 12. The rolls 10 and 12 are preferably not freely rotatable on the support 14, but are preferably frictionally resisted in their rotation such as by means of a relatively close fitting condition between the rolls 10 and 12 and their respective spindles 15, to prevent "over-running" of the rolls during operation of the mechanism.

The dunnage-producing machine comprises a crumpler section 16 into which the superimposed webs 10a and 12a of sheet-like material are drawn, with crumpler section comprising a funnel-like portion 17, a central reducing portion 17a, and a distal end compressing portion 17b, defining a continuous passageway 18 therethrough. Funnel-like portion 17 comprises a widened mouth 19 which slopes inwardly to a narrowed throat 20, so that the webs of sheet-like material are compressed radially inwardly, or crumpled inwardly into an irregular random-like pattern, resulting in a generally rectangular-shape pad-like configuration as they pass through portion 17 into the throat 20.

The lateral edges of the webs 10a and 12a are rolled inwardly as they commence to leave the respective roll of material, with such edges being rolled into superimposed spiral-like relationship, and with such spirally rolled edges being disposed in generally confronting, practically abutting condition as they move into the mouth 19 of funnel-like portion 17 of the crumpler section. In this connection there is provided a pusher mechanism 22 positioned upstream from mouth 19 of crumpler portion 17, for pushing downwardly on the webs of material and thus urging the lateral edges of the webs into rolled form as the webs are drawn into the crumpler section.

Pusher mechanism 22 is preferably adjustably mounted on the machine so that it may be moved longitudinally of the crumpler section 16 for adjusting the position of the pusher with respect to the mouth 19. In this connection, mechanism 22 may comprise a generally horizontally-projecting supporting rod 24 suitably threaded as at 24a, and mounting an elongated support plate 26 on rod 24, as by means of mounting section 26a and associated holding nuts 28. Support plate 26 may have a depending rod 30 supported therefrom, as by means of threaded end section 32 extending through a complementary opening 34 in the support plate 26. A series of the openings 34 may be provided for adjusting the upstream position of the pusher mechanism 22 with respect to the mouth 19 of the funnel portion 17. Rod 30 at its lower end may have a generally arcuate-shaped pusher member 36 (FIGS. 4 and 7) which is adapted to slidingly engage the top side of the inner web 12a and maintain it in engagement with the outer web 10a as the webs move relative to the pusher mechanism 22, and into the crumpler section 16. As best seen in FIGS. 2 and 7, pusher member 36 extends below the horizontal plane of the lower extremity of mouth 19 and below the rolled edge portions R of the sheet-like material. Threaded end portion 32 of rod 30 in conjunction with nuts 37 provide for vertical adjustment of pusher 36. As can be seen in FIG. 4, the mouth 19 of the funnel-like portion 17 of the crumpler is preferably provided with a curved guide member 40 defining at least the lower extremity of the path of movement of the superimposed webs of sheet-like material, for guiding the spirally-rolled edge portions R of the sheet-like material as they pass into the mouth 19 and toward the throat 20. Guide 40 ensures that the edges will not inadvertently tear due to engagement with the lower corners of portion 17 of the crumpler and aids in rolling the edges of the webs of material into spiral form. As can be best seen from FIG. 7, the rolled edge portions R of the web-like stock material commence to crumple inwardly as at 41 as the flow of stock material passes the pusher mechanism 22. The crumpling occurs in a random pattern and continues as the stock material passes into funnel portion 17 and thence into reducing portion 17a of the crumpler. Such random deformation of the stock material produces considerable void areas in the formed pad, resulting in a low density pad. The length of pusher member 36 is preferably approximately equal to the internal width of throat 20.

Generally central portion 17a of crumpler section 16 is preferably of rectangular-like configuration, which causes compression of the webs of material into a pad-like configuration as they pass through the throat 20 and into portion 17a. Portion 17a preferably has slots 44 (FIGS. 1 and 2) in the upper and lower walls thereof and into which extend stitcher means 45 for connecting the confronting abutting rolled-edge portions R of the sheet material, as the latter is drawn through the crumpler section. In the embodiment illustrated, stitcher or connecting means 45 comprises loosely meshed equal size spur gears 46, 48. Gears 46 and 48 are mounted upon a respective shaft 46a, 48a which in turn are rotatably mounted in bearing structure 50 secured as by means of bolts 52 to the frame 54, supporting the gearing. Lower shaft 48a may have a pulley 56 secured thereto, which in turn is operably coupled as by means of belt and pulley 58 to a geared speed-reduction unit 60, which in turn is driven by a preferably electric motor 62. It will be seen that, upon actuation of the motor 62, the pulley 56 drives the shaft 48a, which in turn rotates the gear 48, thus rotating the meshed gear 46. Bearings 50 are preferably adjustably mounted as by means of elongated slots in the framework 54, for selectively varying the spacing between the pitch diameters of the meshed gears, thus providing for varying the degree of stitching provided by the stitching or connecting mechanism. As the crumpled web-like material passes into the stitching mechanism, the confronting sections of the rolled edges R thereof which have been compressed and urged together due to the funnel portion 17 and central reducing portion 17a of the crumpler section, are stitched together due to the coining action of the meshing gears, and generally centrally of the dunnage pad P, and as at 66 (FIG. 5) to securely hold the crumpled webs of sheet material together into a unitary pad-like configuration having very good resiliency characteristics. After passing the stitching mechanism 45, the formed pad passes into distal end compressing portion 17b of the crumpler section prior to being emitted from the machine.

Compressing portion 17b has a downwardly sloping top wall 68 and inwardly sloping or converging sidewalls 70 which further compress the pad of dunnage material into a formed, resilient article.

A cutter mechanism 76 of any suitable type may be provided at the exit end of compressing portion 17b, for selectively cutting the produced run of dunnage pad into desired lengths. In operation, the motor 62, which operates the stitcher 45 which in turn moves the stock material through the machine, would be preferably provided with a conventional foot switch (not shown) wherein an operator could selectively control the emission of the length of pad-like dunnage from the mechanism and, by means of cutter mechanism 76, could selectively cut the formed dunnage pad to the desired lengths wanted, and could then shut down the machine until further cushioning dunnage was needed.

As can be seen in FIGS. 5 and 6, the lateral rolled portions of the dunnage product P are of generally oval, pillow-like configuration, having considerable resiliency due to the superimposed rolling of the lateral edges of the webs of stock material and random crumpling of such rolled edge portions, while the central section, which is stitched as at 66, is compressed together into a fastened or held configuration, which holds the dunnage product in pad-like form, while providing excellent resiliency in the product. A 12-inch wide dunnage pad has been produced from a total paper width of 100 inches made up of one 60-inch wide roll (e.g. roll 10) and one 40-inch wide roll (e.g. roll 12) of 30 lb. kraft paper. A piece of the dunnage pad approximately 9½ feet long weighs about one pound and provides about one cubic foot of cushioning dunnage, with the latter thus having a density of about one pound per cubic foot. Other widths of pads can, of course, be produced by varying the size of the crumpler section. Varying the stock material width and/or the weight and type of paper will, of course, vary the density of the finalized pad. While the feed stock material and orientation of the mechanism has been illustrated in the drawings as being generally horizontal, it will be understood that it could be arranged for generally vertical feeding and orientation.

From the foregoing discussion and accompanying drawings, it will be seen that the invention provides a novel cushioning dunnage-producing mechanism wherein sheet-like material is rolled at its lateral edges into spiral-like form, with the rolled edge portions oriented into confronting relationship and crumpled down into a pad-like configuration, and is stitched or connected together generally centrally thereof, resulting in a pad-like dunnage product of considerably resiliency. The invention also provides a novel method of producing a pad of cushioning dunnage by combining preferably a plurality of webs of sheet-like material and rolling the edges thereof into a rolled configuration for abutting coaction and subsequently connecting or stitching together of such rolled edges centrally thereof, so as to provide a highly resilient pad-like configuration of dunnage. The invention also provides a novel dunnage product having considerable resiliency and of relatively low density per unit volume, and comprising lateral highly resilient portions formed of rolled randomly crumpled portions of sheet-like material and a central portion connected or stitched together to maintain the pad configuration of dunnage product.

The terms and expressions which have been used are used as terms of description and not of limitation and there is no intention in the use of such terms and expressions of excluding any equivalents of any of the features shown or described or portions thereof, and it is recognized that various modifications are possible within the scope of the invention claimed.

I claim:

1. In a mechanism for producing low density pad-like cushioning dunnage from sheet-like material comprising, crumpler means having an entry opening and adapted to receive sheet-like material therein, means for causing inward rolling of the lateral edges of the sheet-like material into generally rolled form prior to passage of the sheet-like material into said crumpler means, means for connecting the confronting rolled edges resulting in a unitary dunnage product of pad-like configuration, means for rotatably mounting at least one roll of sheet-like material on the mechanism, said means for causing said inward rolling including pusher means mounted on said mechanism and directed laterally causing inward rolling of the lateral edges of the sheet-like material prior to passage of the sheet-like material into said crumpler means, said entry opening of said crumpler means for receiving the sheet-like material being of a greater dimension in one direction than in the other direction, said entry opening causing the sheet-like material to be generally radially compressed as it passes through said crumpler means and the rolled edges of the sheet-like material are disposed in confronting abutting condition as they pass through said crumpler means, said connecting means comprising means for stitching the rolled edges of the sheet-like material together by coining the latter at the juncture of the rolled edges to form a unitary dunnage product of pad-like configuration.

2. A mechanism in accordance with claim 1 wherein said connecting means includes means for moving the sheet-like material through said crumpler means.

3. A mechanism in accordance with claim 1 wherein said means for causing said inward rolling comprises pusher means extending transversely of said mechanism and disposed generally centrally thereof in a direction transverse of said mechanism and in the path of movement of the sheet-like material for engagement with the latter, said pusher means being outwardly bowed in the direction of extension of said pusher means.

4. A mechanism in accordance with claim 1 wherein said crumpler means comprises a funnel-like receiving portion defining said entry opening, a central reducing portion, and a distal end compressing portion.

5. A mechanism in accordance with claim 1 wherein said connecting means comprises vertically-spaced rotatable meshed gears disposed generally centrally of said crumpler means in a direction transverse of the latter, and adapted to stitch the confronting rolled edges of the sheet-like material together as the latter passes through said crumpler means.

6. A mechanism in accordance with claim 1 including cutter means downstream from said crumpler means for cutting the dunnage product into selected lengths.

7. A mechanism in accordance with claim 4 wherein said central reducing portion is of rectangular-like tubular construction.

8. A mechanism in accordance with claim 1 wherein said means for causing said inward rolling comprises pusher means extending to a point laterally beyond the periphery of the entry opening to said crumpler means, so that the sheet-like material moves laterally inwardly from said pusher means into the crumpler means.

9. A mechanism in accordance with claim 1 wherein said connecting means comprises rotatable geared stitcher means located on said crumpler means, and power means coupled to said stitcher means for actuating the latter whereby the sheet-like material is pulled through said crumpler means by said stitcher means as the latter coins the confronting rolled edges of the sheet-like material together.

10. A mechanism in accordance with claim 4 wherein said funnel-like portion includes arcuately-curved guide means at said entry opening for sliding engagement with the sheet-like material passing into the crumpler means.

11. A mechanism in accordance with claim 4 wherein said distal end compressing portion is of tubular-like construction having converging walls for further compressing the radially-squeezed sheet-like material emanating from said reducing portion.

12. In a mechanism for producing low density pad-like cushioning dunnage from sheet-like material comprising, crumpler means adapted to receive the sheet-like material therein, means for causing inward rolling of the lateral edges of the sheet-like material into generally rolled form prior to passage of the sheet-like material into said crumpler means, and means for connecting the confronting rolled edges resulting in a unitary dunnage product of pad-like configuration, and including means for rotatably mounting a plurality of rolls of sheet-like material on the mechanism, said means for causing said inward rolling including pusher means mounted on said mechanism and directed laterally for urging the sheet-like material into engaged condition and causing inward rolling of the lateral edges of the sheet-like material prior to passage of the sheet-like material into said crumpler means, said crumpler means being of rectangular-like tubular construction whereby the sheet-like material is generally radially compressed and the rolled edges of the sheet-like material are disposed in confronting abutting condition as they pass through said crumpler means, said connecting means comprising means for stitching the rolled edges of the sheet-like material together by coining the latter at the juncture of the rolled edges to form a unitary dunnage product of pad-like configuration.

(References on following page)

References Cited

UNITED STATES PATENTS

| | | |
|---|---|---|
| 2,499,463 | 3/1950 | Crary. |
| 2,882,802 | 4/1959 | Walker. |
| 2,924,154 | 2/1960 | Russell. |
| 3,418,890 | 12/1968 | Tachibana. |

FOREIGN PATENTS 593,910   3/1960   Canada.

WAYNE A. MORSE, Jr., Primary Examiner

U.S. Cl. X.R.

93—1.1, 1.5, 84; 156—592